(12) United States Patent
Gadkaree et al.

(10) Patent No.: US 6,225,733 B1
(45) Date of Patent: May 1, 2001

(54) ACTIVATED CARBON ELECTRODES FOR ELECTRICAL DOUBLE LAYER CAPACITORS

(75) Inventors: Kishor P. Gadkaree, Big Flats, NY (US); Pascal Marque, Champagne/Seine (FR)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/319,801

(22) PCT Filed: Nov. 18, 1997

(86) PCT No.: PCT/US97/21222

§ 371 Date: Jun. 10, 1999

§ 102(e) Date: Jun. 10, 1999

(87) PCT Pub. No.: WO98/26439

PCT Pub. Date: Jun. 18, 1998

(51) Int. Cl.[7] ........................... H01J 1/02
(52) U.S. Cl. ............... 313/352; 313/353; 313/354; 313/355; 313/311; 361/301.1; 361/321.4; 361/321.5

(58) Field of Search ................... 313/352, 353, 313/354, 355, 311; 361/301.1, 321.4, 321.5

(56) References Cited

U.S. PATENT DOCUMENTS

| | | | |
|---|---|---|---|
| 3,536,963 | 10/1970 | Boos | 317/230 |
| 4,136,472 | 1/1979 | Delvo | 40/471 |
| 4,136,473 | 1/1979 | Coe | 40/518 |
| 4,562,511 | 12/1985 | Nishino et al. | 361/324 |
| 4,609,972 | 9/1986 | Edeling et al. | 361/433 |
| 4,725,927 | 2/1988 | Morimoto et al. | 361/433 |
| 5,142,451 | 8/1992 | Kurabayashi et al. | 361/502 |
| 5,451,444 | 9/1995 | DeLiso et al. | 428/116 |

*Primary Examiner*—Vip Patel
*Assistant Examiner*—Kevin Quarterman
(74) *Attorney, Agent, or Firm*—Angela N. Nwaneri

(57) ABSTRACT

The fabrication of activated carbon based supercapacitors. In particular, a monolithic activated carbon plate or honeycomb electrodes (4, 6 and 8) made by extrusion, molding, or casting is described. The carbon monolithic plates or honeycombs are fabricated from synthetic carbon precursor and active ingredient leading to superior electrical properties.

12 Claims, 1 Drawing Sheet

ACTIVATED CARBON ELECTRODES FOR ELECTRICAL DOUBLE LAYER CAPACITORS

FIELD OF THE INVENTION

The invention relates to high surface area, activated carbon electrodes which may be used as electrodes for electric double layer capacitors.

BACKGROUND OF THE INVENTION

Capacitative energy storage in EDLC uses the charging of the so-called double layer at an electrode/electrolyte interface where polarization of the electrode induces a rearrangement of ions having the opposite charge sign in the immediate vicinity of the electrode. Depending on electrode materials and electrolyte chemistry, typical double layer capacitance values range from 10 to 50 pF/cm$^2$ on metals. In double layer capacitors, the capacitance arises by separation of electron at a metal or carbon electrode surface and ionic charges in the immediately contiguous electrolytic solution. Because the charge separation arises over only a distance of 2 to 5 Å, large specific capacitance values can be developed, i.e., 10–20 μF/cm$^2$ of the electrode interface.

An EDLC cell is composed of two high specific area electrodes and the overall capacitance is given by $1/C_{cell} = 1/C_1 + 1/C_2$, where $C_1$ and $C_2$ are the capacitances of the first and second electrode respectively. Ideally, $C_1$ equals $C_2$ so that the capacitance of the cell is one half that of an individual electrode and the specific capacitance, per g of the cell is one fourth of the specific capacitance of an individual electrode, e.g., C=50 F/g of electrode material having theoretical 200 F/g specific capacitance.

EDLC devices usually exhibit a set of unique properties having an effect on their performances. The most important feature is the frequency dependence of the capacitance and equivalent series resistance (ESR). Such behavior reflects the distributed nature of the double layer capacitance in relation with the porous structure of the electrodes. Consequently both the capacitance and ESR decrease with increasing frequency. At high frequency (short times), only the exterior surface or large pores of the carbon is available for charge or discharge. At lower frequencies, current penetration into the porous structure becomes progressively deeper until all the electrode surface area is accessed at very low frequency. This directly impacts the practical capacitance in relation with the charge/discharge rate.

Compared to batteries, the charging/discharging process of capacitors are virtually energy loss free. Another consequence of the non-faradaic nature of EDLC charging is that there is virtually no limitation in cycling life provided the materials used are chemically and environmentally stable. Besides the capacitance value of an electrode material, the charging/discharging kinetics of the double layer is very important as it directly influences the power capabilities of the assembled capacitor. The kinetics of porous carbon electrodes have been studied by Soffer et al, and such studies have shown that the electrode microstructure is key to fast charging/discharging processes as it directly influences the pore size distribution, the mean pore diameter and length, and the conductivity of the carbon phase.

Specific surface area and pore size distribution are important parameters to control in order to optimize the specific capacitance, per g of the electrode material. It has been shown that specific surface area up to 2000 m$^2$/g are linearly correlated to specific capacitance (F/g). Since high area conducting carbon materials are available with specific area values up to 2000 m$^2$/g, very large specific capacitance g$^{-1}$ can theoretically be achieved. For example, for a specific area of 1000 m$^2$/g, the specific capacitance values up to 200 F/g can ideally be obtained. In practice, these high capacitance values are not realized due to physical and chemical limitations that still need to be better understood. It has also been shown that the pore size distribution of activated carbon materials has an effect on the temperature dependence of capacitance, (C). Results have shown that a desirable microstructure is one that yields high specific surface area while maintaining a low contribution of ultramicropores (d<2 nm) to the total pore volume. However, measured capacitance values for such microstructures have been below the expected 10 to 20 pF/cm$^2$, with the reported high value for specific capacitance of activated carbon fiber electrodes[13] being only 6.9 μF/cm$^2$. At carbon electrodes, polarization is said to induce a semiconductor type space charge capacitance. This additional capacitance has a low value and dominates the capacitive charging process.

Marked effects of surface chemistry of porous carbons on double layer charging has been observed. For example, solvent cleansing or thermal treatments in controlled atmospheres have shown variations in capacitance values and/or in cathodic and anodic charging behaviors. Another acknowledged effect of carbon surface chemistry is the correlation of the current leakage of a capacitor with the fraction of surface acidic functional groups. Heat treatment (1000° C.) of activated carbon fibers under $N_2$ reduces the amount of acidic groups and lowers the leakage current of the capacitor in the charge state. A direct consequence of this effect is that phenol resin based carbon fibers are preferred to pitch, cellulose or PAN fibers having high contents of acidic groups.

Supercapacitors with high capacitance i.e. anywhere from 1 F to 1500 F are becoming increasingly important as energy storage devices for various applications such as consumer electronics (low back up currents 1 mA or less) needed in CMOS, RAMs, Clock ICs in consumer electronics and microcomputers; for secondary power sources or for starting small electric motors (up to 50 mA); and actuators or primary power sources for transient needs(up to 1 A). The development of large specific energy and power capacitors is said to open up a new range of potential applications, including hybrid and electrical vehicles, car engine cranking, cold start for exhaust control devices, utility load leveling, internal combustion engine starting, and many others.

Many of today's commercial supercapacitors are based on activated carbon electrodes with aqueous or organic electrolytes. Typically the construction of such electrodes is based on either activated carbon fibers or activated carbon powder. From the fibers an electrode is made by fabricating a sheet of fibers via papermaking techniques. The sheet is then plasma sprayed with aluminum to form a current collector. A tubular capacitor is then formed by spiral winding such sheets with a polymeric separator in between. When the electrodes are made from powders the fabrication typically consists of mixing the powders with binders and then coating this mixture on a metallic current collector sheet. The electrodes thus fabricated are then packaged with separators, typically a polymeric thin porous film, and in appropriate containers made of stainless steel or other material. Attempts are continually being made to increase the power density of these capacitors by optimizing the carbon nanostructure and surface chemistry as well as increasing the packing density of activated carbon powders and minimizing the amount of space occupied by the current collectors separators and other components so that more active material is packed in a given volume or for a given weight.

Accordingly, it is the object of the present invention to provide an activated carbon electrode which overcomes many of the above-stated shortcomings of fiber and powder-based activated carbon electrodes.

SUMMARY OF THE INVENTION

The invention relates to monolithic high surface area activated carbon electrodes. In particular, the electrodes are made of continuous carbon structures which are produced in-situ and characterized by having apparent densities between 0.1 to 1.6 g/cm$^3$, and flexural strengths of at least 50 psi.

The monolithic activated carbon electrodes are formed using a raw material mixture of (a) thermosetting resin which resin can be either solid or liquid, and (b) hydrophilic filler, preferably, carbonizable, organic and/or inorganic filler. Optionally, for certain electrode structures such as honeycombs, a temporary organic binder may be added to the mixture. Also, if desired an effective amount of extrusion aids may also be added to the mixture in order to facilitate the extrusion process to form the monolithic electrodes.

The use of a filler is necessary in order to manufacture the monolithic electrodes of the invention. Attempts to caste a plate of the resin to fabricate the electrodes resulted in many manufacturing difficulties. Particularly during carbonization, there is about a 50% weight loss of the resin in the form of low molecular weight compounds. The carbon yield is thus only about 50%. Associated with this loss in material is a large volume shrinkage which leads to severe warping and cracking of the plate, making it very difficult to fabricate a monolithic and continuous activated carbon electrode.

In one aspect, the mixture is formed into a self-supporting structure which is then dried, cured, carbonized, and activated in situ to form a monolithic activated carbon electrode.

The monolithic, activated carbon electrodes of the invention can be formed by any known methods such as by molding, casting, extrusions etc.

DETAILED DESCRIPTION OF THE INVENTION

Recently, a unique carbon technology to fabricate flat plates, honeycombs and other shapes of high surface area activated carbons has been disclosed for example, in U.S. Pat. No. 5,451,444 (DeLiso), U.S. Ser. No. 08/450,857 filed May 25, 1995 (DeLiso), and U.S. Ser. No. 08/741,840 filed Oct. 31, 1996 (Gadkaree). These structures are continuous carbon structures formed without any binders, which are characterized by very high strengths, making them particularly useful for the present electrodes.

We have found that the addition of certain fillers to the resin mixture minimizes shrinkage, eliminates warping, and allows the fabrication of monolithic carbon structures in the form of plates and honeycombs for example. In addition to the above advantages, fillers also reinforce the structure and prevent the formation of cracks. Fugitive fillers which burn off during carbonization create paths for the escape of low molecular weight compounds, and allow activation of the internal structure, thus enabling uniform activation through the structure and increasing the capacity of the structure.

The advantages of the continuous carbon monolithic electrodes include: (1) higher packing density of carbon, and therefore, higher capacity when compared to powder and binder systems; (2) more compact device which is easier to fabricate since no metal strips are needed; (3) carbon has sufficient conductivity therefore, a significantly thinner film current collector will be sufficient in the present electrode design, leading to a more efficient use of space; and (4) a high capacity compact capacitor.

Figure 1:
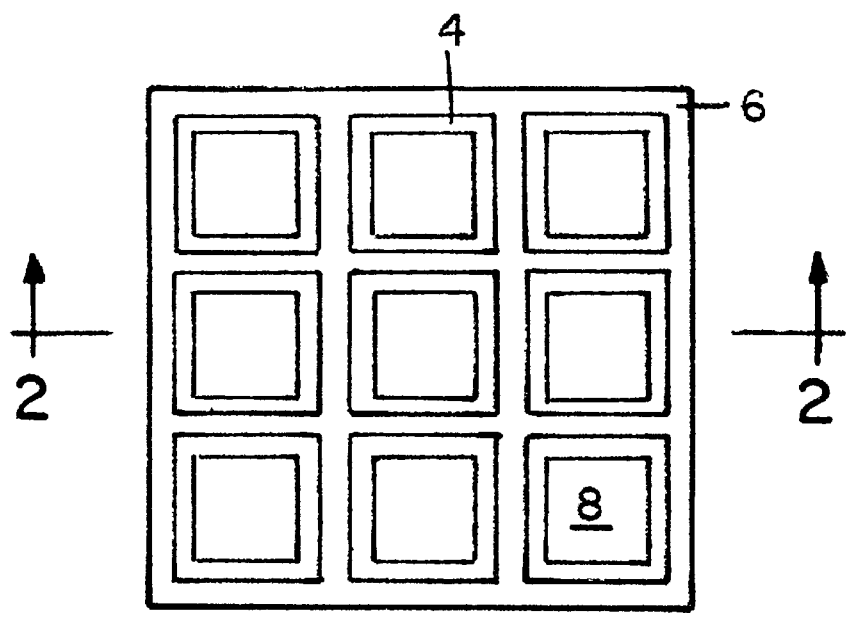
FIG. 1 is a cross-sectional view of an electric double layer electrode according to one embodiment of the invention.
Figure 2:
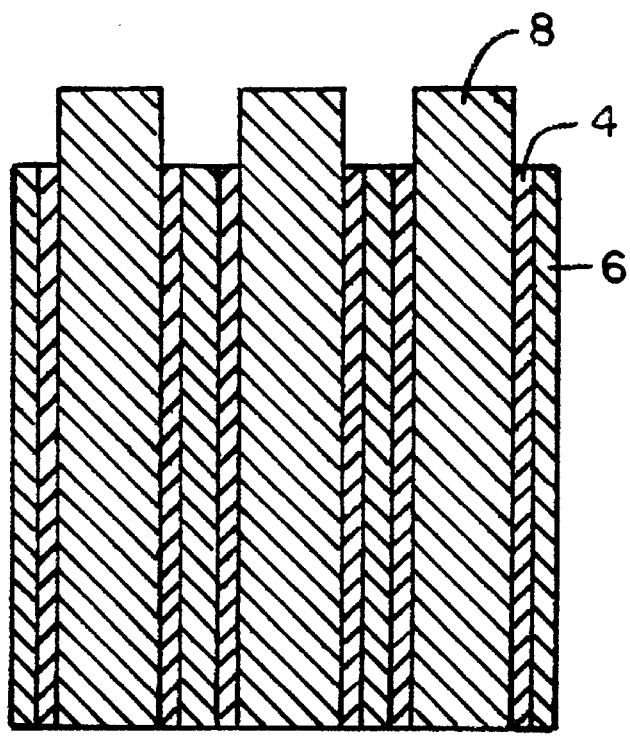
FIG. 2 is a cross-sectional view taken along line 2—2 of FIG. 1.

In one preferred embodiment, a monolithic high surface area electrode having a high capacity compact capacitor can be obtained from the present system in the form of a honeycomb by using the honeycomb itself as one electrode, and introducing the second electrode in the form of monolithic rods in the cells (or holes), with a separator formed between the two electrodes to electrically isolate such electrodes as illustrated in the figures. The electrode occupying the cells or holes of the honeycomb may be fabricated in one piece as an extruded rod. Alternatively, they can be formed from a carbon powder/binder system. In the case of the powder electrode a metal wire will have to be inserted in the cell as a current collector. This embodiment of the invention is illustrated by FIGS. 1 and 2. In this embodiment, the electrode device is a 9-cell honeycomb structure in which two electrodes 6 and 8 are separated by a separator 4. In the honeycomb device, one electrode, 6 is formed by extruding the resin composition of the invention into a honeycomb having a desired number of cells. The second electrode, 8 can be formed for example, by extruding the same composition into rods which are then inserted into the cells. The separators may be formed in the cell walls before electrodes 8 are inserted into the cells.

In the honeycomb design, all the electrodes in the cells are connected together. With the cell walls of the honeycomb forming the other electrode, the result is a large number of capacitor in parallel, with the total capacity being $$C = nCi$$

where n is the number of cells in the honeycomb and Ci is the capacity of one cell capacitor.

The major difficulty in this approach is that the separator polymer film may be difficult to introduce in the honeycomb cells. One inventive approach of introducing the separator is by dipping the honeycomb in a polymer/solvent solution, for example, in a 10 wt % solution of PVDF and acetone. The honeycomb is then removed from the solution and dipped immediately in a solution of organic solvent and water to precipitate a porous polymer film on the honeycomb. The thickness and porosity of the separator is determined by the concentration of the polymer/solvent solution and also by the ratio of solvent/water. This film serves as a separator. Other polymer films may be deposited in the same way. Another approach to depositing the separator is to deposit a thin layer of polymer particles inside the cell via a fluidized bed or through a hot air gun. Ceramics or glass may also be deposited via plasma spraying or other thin film deposition techniques to form the separator. In one embodiment, the separator is a porous polymer film which is introduced into the cells of a honeycomb. In another embodiment, flat plate-type electrodes were formed using the monolithic activated carbon of the invention.

To form the electrodes by extrusion, typically dry components are blended and then mixed with liquid components in a muller. Water is added if necessary to make the mixture handleable for extrusion. The mixture is then extruded. Conventional extrusion equipment can be used. For example, the extrusion can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The mixture can be extruded into any convenient shape or size depending on the specific application. The preferred shape is a honeycomb structure. Honeycombs can have typically about 1.3–94 cells/cm$^2$ (about 9–600 cells/in$^2$) and wall (web) thicknesses of about 0.15 to 1.3 mm (about 3–50 mils), although lower or higher cell densities may be fabricated by using appropriate forming dies.

The shaped bodies are then dried. Drying can be done in air at room temperature-80° C., or in dielectric or microwave dryers. Without wishing to be bound by theory, it is believed that the fillers provide adequate pathways for escape of gases during the heating, thus preventing build up of by-products in the body.

The dried bodies are then cured in the shaped form by heating under the specific temperature and time conditions required for the given resin. The curing can be done by standard methods, in a conventional oven. Standard curing conditions are generally found in the manufacturers' literature. For example, for phenolic resole 43290 from Occidental Chemical Co. the shaped body is heated in air to about 140–155° C. The final temperature is attained slowly so that the body does not distort. Optionally, the body can be first heated to about 90° C.–100° C., then to about 120° C.–130° C. and held at this temperature for about 1–2 hours. It is then heated to about 140° C.–155° C. and held for about 30 minutes-2 hours for final cure. Curing can also be done in a dielectric or microwave oven.

The cured, carbonized and activated carbon structure is self supporting and can be used as an electrode without any further machining or processing.

Carbonization is carried out by heating the body in an inert or reducing atmosphere such as nitrogen or argon or forming gas. Forming gas is a mixture of nitrogen and hydrogen. Typical mixtures by volume are 92:8 or 94:6 $N_2:H_2$, although any mixtures can be used.

Carbonization temperatures are about 600° C.–1100° C. or more typically about 700–1000° C. for a length of time of usually about 1–20 hours. While the body is in the temperature range of about 300–600° C., the fugitive materials vaporize. During carbonization low molecular weight compounds separate out and carbon atoms form graphitic structures. After carbonization, the body typically contains random three dimensional oriented graphitic platelets with amorphous carbon between the platelets. Various fillers incorporated in the mixture may have the desirable effect of minimizing shrinkage during carbonization when 40–60% of the initial weight of the resin is lost. The fillers also act as reinforcement to prevent the formation of cracks and to deter propagation in the structure. We have found that the use of fillers facilitates the formation of monolithic structures on a sufficient scale to form supercapacitor electrodes.

Activation is done by partially oxidizing the carbonized body in a suitable oxidant such as $CO_2$, steam, air, or a combination of these, etc. Activation can be carried out at temperatures between about 700° C.–1000° C. Activation conditions depend on type and amount of resin, flow rate of gas, etc. Partial oxidation during activation causes the removal of the amorphous carbon and the formation of molecular size porosity between the graphitic platelets. This porosity and the graphitic platelets impart advantageous capacitive properties to the resulting activated carbon body making such body particularly suitable as electrodes for supercapacitors and double layer capacitors.

Resins

Any resin having a high carbon yield is suitable for the high surface area activated carbon electrodes of the invention. By high carbon yield, we mean that the ratio of the weight of carbon to the weight of the cured resin is greater than 0.1, preferably, greater than 0.2, and more preferably, at least 0.4, after carbonization.

Suitable resins include, crosslinkable synthetic resins, or mixtures of such resins with other modifying agents. When the resins are used in combination with modifying agents, it is preferred that the resin constitute greater than 50% of the mixture. Phenolic resins such as phenol formaldehyde, and furfuryl-based resins such as furan, are resins of choice because of their high carbon yield on carbonization. Phenol formaldehyde can be used in liquid form (resole) or solid form (novolak). Furan can be used in liquid form.

Non-limiting examples of useful resins include:
(i) phenolics modified with aniline;
(ii) copolymers with phenolics such as with amines, chlorinated phenols, nitromethane, organosilicone compounds, alkyl resins, urea or melamine;
(iii) phenolics treated with trichlorohydroxin, ether resin, ethylene oxide polymers, ketones, and hydrogen peroxide;
(iv) blends of phenolics with epoxy resins, furfuryl alcohol resins, ketoneadelyde condensates, polyamide-phenolic melamine and urea resins, glycerine, natural and synthetic rubber, polyvinyl acetal resin, polyvinyl acetate, polyvinyl butyral, polyvinyl chloride and other blends and other similar known blends;
(v) acetylene phenol, acrolein phenol, cellulose-phenol, cyclopentadienephenol, ketone-phenol, lignin phenol, styrene phenol, starch phenol, silicic acid ester phenol, polysocyanate phenol, sulfur phenol and others; and
(vi) resorcinol-formaldehyde.

Extrusion of the resinous mixtures into honeycomb-shaped electrodes, in particular, mixtures containing phenol formaldehyde resins, can be achieved by the method disclosed in co-pending, co-assigned U.S. Ser. No. 08/650,685 filed May 20, 1996, incorporated herein by reference. Phenol formaldehyde resins are commercially available in liquid or solid form and are made by reaction of phenol and formaldehyde. It has been disclosed in the above referenced application that when the reaction is carried out between one mole or more of formaldehyde per mole of phenol under alkaline conditions, the reaction once started is capable of continuing to completion without further addition of material until the reaction mass has become insoluble and infusible. These resins are referred to as single stage resins or resoles. In commercial practice, in most cases, the reaction is carried to a predetermined point and the resin is then cooled to retard the reaction. Most commercial products are aqueous liquids with various degrees of viscosity (e.g. 100–1000 cps). The resin is then further processed to various shapes, etc.

When the reaction between phenol and formaldehyde is carried out in acidic medium with one or more moles of formaldehyde per mole of phenol, the reaction rapidly goes to formation of an insoluble and infusible mass. In commercial practice the reaction is carried out in acidic medium by condensing one mole of phenol with less than 0.9 moles of formaldehyde. In this case, the reaction proceeds to the formation of a permanently fusible resin, which requires addition of some form of formaldehyde before it converts to the insoluble, infusible stage. This resin is called a two stage resin. The product of the first stage is called novolak. In order to cure novolaks some form of formaldehyde or formaldehyde donor must be added to bring the ratio of formaldehyde to phenol to the proper level for curing. Typically, hexamethylenetetramine ("hexa") is commonly used and is blended with resin in finely divided form. Under the influence of heat, the hexa breaks down into formaldehyde and ammonia and formaldehyde reacts with novolak causing it to cure. Many other curing agents other than hexa are described in the literature such as ethylenediamine-formaldehyde products, anhydroformaldehydeaniline, and methylol derivatives of urea or melamine, paraformaldehyde, etc.

It is important to note that in the practice of this invention, liquid and solid resins are not to be mixed for the extrusion process. Within a liquid resin system, a mixture of different liquid resins can be used, e.g. a mixture of resole and liquid furan. Likewise within a solid resin system, a mixture of different solid resins can be used such as in commercial bulk molding compounds. When casting processes are used, mixtures of solid and liquid resins may be used.

When a liquid resin is chosen, the preferred resin is phenolic resole having a high viscosity (100–1000 cps). One especially suited phenolic resole resin is available from Occidental Chemical Corporation, Niagara Falls, N.Y. under the product name of Plyophen 43290. Plyophen 43290 is a liquid one step phenolic resin containing phenol, formaldehyde, and water, having a specific gravity of 1.22–1.24, a boiling point >100° C. and a pH of 7.5–7.7@ 100 gm/l. Another suitable phenolic resin is a product available from Borden Chemical Co. with the product name of Durite. This resin is chemically similar to Plyophen resin but has a viscosity of about 300 cps.

Furan resins are available as liquids. One furan that is suitable to the practice of the present invention is supplied by QO Chemicals, Inc. under the name of Furcarb® LP. Furcarb® LP resins are preparations of phenol (4% max) in furfuryl alcohol, and have a specific gravity of 1.2, and a boiling point of 170° C. The viscosity is 300 cps.

When solid resin is chosen, the preferred resin is phenolic novolak.

Phenolic molding compounds are available commercially. These molding compounds are solid and contain various mineral, organic and inorganic fillers usually at about 25 to 70 wt. %. Such commercial products may be used in the present invention. The solid compounds can be ground to a fine powder and the binder, extrusion aids, and additional fillers added and mixed in, and extruded. Depending on the compound and the content and type of filler already present, the level of filler and binder is adjusted to give the ranges of this invention. Molding compounds available from DUREZ Division of Occidental Chemical Co. such as general purpose compounds, medium impact compounds, glass-filled or heat-resistant electrical grades or compounds identified by numbers such as 32424, 32110, and 18420 can be used. Several molding compounds are available with wood flour, cotton or other type of organic fillers also and such compounds can also be used.

Temporary Binder

A temporary or fugitive binder is used to bind the resin and fillers, and will be removed in the heat-treatments. With either type of resin, a plasticizing organic binder is most typically used. A plasticizing organic binder contributes to the plasticity of the mixture for shaping into a body. The plasticizing organic binder according to the present invention refers to cellulose ether binders. Some typical cellulose ethers are methylcellulose and its derivatives such as ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose, or combinations of these being preferred. This can include a mixture of different types of methylcellulose and/or different types of hydroxypropyl methylcellulose. Some sources of methylcellulose and/or its derivatives are Methocel A4M, F4M, and F40M from Dow Chemical Co.

Extrusion Aid

Extrusion aids are included as optional additions to the raw material mixture in amounts sufficient to enhance the lubricity of the mixture for ease in passing through the extruder and die, especially in solid resin mixtures. The extrusion aids are the same for both types of resin mixtures. Some preferred extrusion aids are soaps, fatty acids such as oleic, linoleic acid, etc., polyoxyethylene stearate, etc. or combinations of these. Especially preferred is sodium stearate. Optimized amounts of extrusion aid(s) depend on the composition and binder, although generally extrusion aids make up no more than about 3% by weight of the mixture.

Fillers

For both liquid and solid resin systems, the filler must be hydrophilic in order to be easily wet by the liquids in the system. The fillers are most typically an oxygen-containing, e.g. oxide substance, and are therefore relatively inexpensive. Generally, with both liquid and solid resins, the fillers can be carbonizable and/or inorganic.

The fillers can be fibrous. Fibrous fillers typically give higher strength and stiffness to a structure compared a particulate structure. According to this invention, by fibrous is meant a length of up to about 1 centimeter, and preferably up to about 500 micrometers. The diameter is up to about 500 micrometers, preferably up to about 100 micrometers, and most preferably up to about 10 micrometers.

We have previously disclosed that for liquid resin systems, it was found that addition of a hydrophilic carbonizable (essentially organic) filler with or without a hydrophobic organic filler, (preferably fibrous), is necessary to form a good honeycomb extrusion. Hydrophilic organic fibrous filler allows the liquid resin to infiltrate the fibrous structure at high loading levels. The mixture has good rigidity and is extruded into a honeycomb shape easily and maintains the shape on carbonization. Inorganic hydrophilic fillers preferably with a fibrous morphology can also be used with liquid resins in addition to the carbonizable filler. Mixtures of organic and inorganic fillers result in optimized strength and rigidity of the final carbon product, as well as minimization of cost. Inorganic fillers also minimize shrinkage and warpage.

Both natural and synthetic carbonizable fillers can be used. Examples of natural materials are wood, such as pine, spruce, redwood, ash, beech, birch, maple, and oak; sawdust; shell powders such as, ground almond shell, coconut shell, apricot pit shell, peanut shell, pecan shell, and walnut shell; cotton fibers such as, cotton flock, cotton fabric, cellulose fibers, and cotton seed fiber; chopped vegetable fibers such as, hemp, coconut fiber, jute, and sisal; as well as other materials such as corn cobs, citrus pulp (dried), soybean meal, peat moss, wheat straw, wool fibers, corn, potato, rice, and tapioca etc. Flour from grains such as wheat, corn, rice etc, may also be used. Nonlimiting examples of synthetic materials are regenerated cellulose, rayon fabric, cellophane, etc.

Examples of particularly suitable carbonizable fillers for liquid resins are cellulose, cotton, wood, and sisal, or combinations of these, all of which are preferably in the form of fibers. In one useful embodiment, the carbonizable fiber filler is a cellulose fiber supplied by International Filler Corporation, North Tonawanda, N.Y., having the following sieve analysis: 1–2% on 40 mesh (420 micrometers), 90–95% thru 100 mesh (149 micrometers), and 55–60% thru 200 mesh (74 micrometer).

Another approach for making a honeycomb or flat plate electrode structure according to the invention is to utilize a preformed structure of organic material such as cellulose fibers for example, and to impregnate the resin into the structure by dipping, spraying etc. The impregnated structure is then cured, carbonized and activated to form a monolithic electrode structure.

Some inorganic fillers that can be used are oxygen containing minerals such as clays, zeolites, talc, etc., carbonates, such as calcium carbonate, aluminosilicates such as kaolin (an aluminosilicate clay), flyash (an aluminosilicate ash obtained after coal firing in power plants), silicates, e.g. wollastonite (calcium metasilicate), titanates, zirconates, zirconia, zirconia spinel, magnesium aluminum silicates, mullite, alumina, alumina trihydrate, spinel, feldspar, attapulgites, and aluminosilicate fibers, cordierite powder, sand (silica), vermiculite, etc. In some cases, activated carbon powder or graphite powder may also be used to replace a fraction of the filler. However, if activated carbon or graphite powder is used the resin based carbon produced in situ remains the main active part of the structure. The addition of graphite increases conductivity of the electrode.

Examples of especially suited inorganic fillers are cordierite powder, talcs, clays, and aluminosilicate fibers such as provided by Carborundum Co. Niagara Falls, N.Y. under the name of Fiberfax, and combinations of these. Fiberfax aluminosilicate fibers measure about 2–6 micrometers in diameter and about 20–50 micrometers in length.

Hydrophobic organic fillers provide additional support to the shaped structure and introduce wall porosity on carbonization because in general they leave very little carbon residue. Some hydrophobic organic fillers are polyacrylonitrile fibers, polyester fibers (flock), nylon fibers, polypropylene fibers (flock) or powder, acrylic fibers or powder, aramid fibers, polyvinyl alcohol, etc.

In general the particle or fiber size of the fillers must be such that they will be able to pass through the respective die in forming thin walled structures such as honeycombs. For example, for extrusion of a 0.15 mm (6 mil) wall honeycomb through a die that has 152 micrometer openings, up to about 420 micrometer long cellulose fibers have been found to work well. This example is merely illustrative and it is to be understood that the invention is not limited to specific size fillers for specific size structures.

For both solid and liquid resins, the filler makes up about 10 to 85, preferably, 2545 wt. %, of the mixture (excluding any water that is added). The weight ratio of filler to resin is generally about 0.1 to 0.5.

Such compositions are advantageous for liquid resin systems because the carbonizable hydrophilic materials such as cellulose fibers soak in the liquid resin and form a stiff batch which can be extruded. Additionally on carbonization, they yield carbon which results in additional adsorption capacity. The inorganic filler reduces shrinkage on carbonization and imparts strength and stiffness and reduces batch cost.

COMPARATIVE EXAMPLES

The following experiments were carried out with a salt of fatty acid as a pore former in phenolic resin to determine whether monolithic continuous carbon plates can be fabricated, which are suitable for electrodes in supercapacitors. These experiments are described below.

Comp. Example 1

Phenol formaldehyde resole resin available from Borden Inc., was mixed with 5 wt % Zinc Sterate by stirring. Since curing agents are already incorporated in all phenolic resins as received from manufacturer no other additives were added to the resin. The mixture was stirred at room temperature to achieve good mixing. The mixture was then poured in a tray and the tray was placed in an oven at 90° C. to set, and kept at that temperature for three hours. The tray was then heated to 150° C. to fully cure the resin. After curing at 150° C., the tray was removed. The mixture was observed to have cured into a severely cracked and brittle patty which had foamed nonuniformly. Carbonization of this patty at 900° C. in nitrogen resulted in further cracking of the patty, indicating that the process was not useful to make monolithic electrode structures.

Comp. Example 2

In an attempt to minimize the non-uniform foaming observed in comparative example 1, in this experiment, instead of placing the resin-zinc stearate mixture in the oven at 90° C., the tray containing the 5 wt. % Zinc stearate and resin mixture was placed in the oven at 25° C. and very slowly heated(1° C/min) to 80° C., and held at this temperature for 1.5 hours, heated to 95° C. at 0.2° C/min and held at that temperature for 3 hrs. The mixture was further heated slowly at 0.2° C. min to 150° C. and held at that temperature for 3 hrs to complete the curing process. This experiment also resulted in a patty which was severely cracked, and non-uniformly foamed. As in Comp. Example 1, this patty was also not useful for making electrode structures.

EXAMPLES

The following non-limiting examples are provided as illustrations of the invention. All parts, portions, and percentages are on a weight basis unless otherwise stated.

Example 1

Durite resin (from Borden Chemical) at 63.1 wt %, hardwood flour (from American Wood Fibers, WI) at 28.2 wt %, Methocel binder at 4.8 wt %, SAN lubricant at 1 wt %, oil (3 in 1 from 3M) at 1 wt %, phosphoric acid at 1.9 wt % and appropriate amount of water were mixed in a muller and extruded into a ribbon (one inch wide and ⅛ inch thick). The ribbon was then dried at 95 C and then cured at 125 C for two hours and at 150 C for two hours. The cured ribbon was then carbonized in nitrogen at 900 C for six hours and then activated in carbon dioxide for 4 hours at 800° C. No cracking, warping, or distortion was observed in the ribbon. The activated ribbon was cut into rods about one inch long and 1/16 inch square cross section. These rods were measured for capacitance with sulfuric acid as electrolyte via the following procedures.

Two techniques were used to measure the double layer capacitance of the monolithic carbon rods. Both techniques use a three-electrode set-up where the working electrode is the carbon rod immersed in the electrolyte, the counter electrode is a Pt foil and the reference electrode is a Pt wire or a saturated calomel electrode. Chronopotentiometry measures the working electrode potential versus time while a constant current is used to charge the double layer. Since Q=CV with Q is the charge passed in Coulomb, C the capacitance in farad and V the potential in volt, the capacitance is given by $C=\Delta(i.t)/\Delta V$. Electrochemical impedance spectroscopy was also used. In this technique, the frequency response to a small amplitude ac voltage signal is analyzed in order to measure the impedance of the electrode. For a pure capacitor, $Z=1/j\omega C$, where $\omega$ is the pulsation. The capacitance measured by this technique is usually given at low frequency (1 mHz).

Depending on the current value ranging from 50 mA/g to 200 mA/g, the rods according to this example had a specific capacitance ranging from 65 to 115 farads/g. When measured in a standard three-point bend flexural strength test with support span of 0.75", the rods were observed to have strength of 300–600 psi. Thus, the resulting rods are strong and therefore easy to handle during manufacturing. The apparent densities of the rods ranged from 0.6–0.71 g/cm$^3$.

Example 2

The rods as mentioned in example 1 were tested in an organic electrolyte composed of 0.5 M $(C_2H_5)_4NBF_4$ (from Alfa) in propylene carbonate (Aldrich). The electrolyte has a higher operating voltage (3 volts vs 1 volt for sulfuric acid) and the stored energy is greater ($E=\frac{1}{2}CV^2$). In cases where more specific energy and power is required such capacitors may be useful. In particular, high nominal voltage devices as easier to assemble because they require less series connection between cells.

Example 3

A composition containing 61.5 wt % Durite resin, 27.6 wt % hardwood, 4.7 wt % methocel, 1 wt % SAN and 5.2 wt % polyester fiber (which burns out during carbonization leaving porosity behind for activation of carbon) was extruded into ribbon and then cured, carbonized and activated as described above. This composition had a capacitance of 75–85 farads/g in sulfuric acid and 30–50 farads/g in organic electrolyte.

Example 4

A composition similar to example 3 but containing 10 wt % polyester fiber instead of 5.2 wt % as in example 3 was extruded both as ribbon and as a honeycomb. The capacity for the rods made from this composition was 125 farads/g and for the honeycomb was 97 farads/g in sulfuric acid as measured via impedance spectroscopy at 1 mHz. The rods had flexural strengths of 200–400 psi when measured on a 3-point strength test as described in Example 1, again showing that the structures are of sufficient strength to allow the shaping of the material into desired shapes for the electrode device of the invention.

All of these examples show that high capacitance is obtained from monolithic structures made from carbon where the carbon is produced in situ. These high capacitance values are unexpected because difficulty associated with activating such strong, monolithic structures and getting the carbon properly activated, in addition to ensuring that the carbon surface is accessible to the electrolyte.

The following examples illustrate how some of the electrode devices were assembled from the monolithic structures and give the measured values of the capacitance as well as the specific energy that can be stored in such devices.

Example 5

A thin ribbon was extruded from the same composition as described in example 4. After curing, carbonization and activation, two 0.7 mm thick carbon electrodes (2.5 cm×2 cm) were cut. After soaking in the appropriate electrolyte, a cell was assembled by interposing a piece of a porous paper separator in order to prevent shorting between the two electrodes. Capacitance measurements were performed on this cell by connecting the electrodes to the working electrode terminal and the shorted counter and reference electrodes respectively (two electrode configuration). The capacitance of the device with organic electrolyte was 1.3 farads.

Example 6

Rods having the same composition as described in example 4 were cured, carbonized and activated. 4 rods 3 cm long and 0.3 cm square cross section were assembled by interposing a separator sheet between them in a prismatic arrangement where each rod has two sides facing other rods (2×2). Electrical connections were made in a chess board manner. In sulfuric acid electrolyte, the capacitance measured by chronopotentiometry was ranging from 14 to 36 farads. Impedance measurement was 12.7 farads at 1 mHz. In organic electrolyte, the results were 4–7 farads and 2.3 farads respectively.

Example 7

Monolithic honeycombs and rods having the same composition as described in example 4 were prepared. No cracks or warping of the honeycomb or plate were observed. The 9, 12 and 16 cell honeycombs were cured, carbonized and activated yielding the following geometries:

| Sample | Length | Width | Height | Volume, cc |
|---|---|---|---|---|
| 9 cell | 2.5 | 2.5 | 2 | 10 |
| 12 cell | 1.5 | 1.2 | 1.8 | 3.3 |
| 16 cell | 1.5 | 1.5 | 1.9 | 4.3 |

The honeycombs had apparent densities of 0.28 to 0.32 g/cm$^3$. It should be noted that for the purposes of determining the apparent densities of the honeycomb structures, the measured volume of the honeycombs included the volume of the open cells, hence, the relatively lower values for apparent densities.

Rods were prepared with the corresponding geometries enabling the assembling of the devices by individually wrapping each rods with a separator thin sheet and inserting the rods in the corresponding honeycomb cells. The assemblies were allowed to soak in organic electrolyte.

In each case, electrical connections were made between the honeycomb body and a string of clips attached to every rod. Capacitance measurements are summarized in the following table:

| Sample | C (chronopotentiometry) farads | C (impedance at 1 mHz) farads |
|---|---|---|
| 9 cell | 19–38 | 14.7 |
| 12 cell | 15–25 | 10.2 |
| 16 cell | 20–36 | 13.0 |

From examples 5 to 7, the following device characteristics can be derived:

| Sample | Voltage | Energy density Wh/l | Specific Energy Wh/kg |
|---|---|---|---|
| Plates | 3 (organic electrolyte) | 1.6 | 2.2 |
| 4 rods | 1 (aqueous electrolyte) | 2.6–6.7 | 3.2–8.3 |
|  | 3 (organic electrolyte) | 1.9–5.8 | 2.4–7.3 |
| 9 cell honeycomb rod | 3 (organic electrolyte) | 1.8–3.7 | 3.5–7.2 |
| 12 cell honeycomb rod | 3 | 4.0–7.5 | 6.2–11.6 |
| 16 cell honeycomb rod | 3 | 3.8–10.5 | 5.2–14.4 |

Example 8

A composition containing 76.88 wt % novolak phenolic resin powder from Occidental Chemical Co., Niagara Falls, N.Y., 12.8 wt. % of cellulose fiber, 8.92 wt. % methocel binder, and 1.26 wt. % SAN lubricant was extruded into a 1/16" thick ribbon which was then cured, carbonized at 900° C. for 6 hours in nitrogen and activated in carbon dioxide at 900° C. for 7.5 hours. Rods cut from this ribbon were found to have capacitance of 24.4 farads/g in organic electrolyte when measured according to the method described in Example 1. The rods had a capacitance of 136 farads/g in sulfuric acid.

We claim:

1. A monolithic high surface area activated carbon electrode characterized by having an apparent density in the range of 0.1 to 1.5 g/cm$^3$, and flexural strength of at least 50 psi, wherein said continuous activated carbon structure is produced in-situ.

2. A double layer capacitor cell having a first and a second electrode, characterized in that at least one of said electrodes comprises a monolithic activated carbon structure.

3. The double layer capacitor cell of claim 2, wherein the cell is a honeycomb structure having a plurality of cell walls defining a plurality of cells.

4. The double layer capacitor cell of claim 3, wherein the cell walls comprise the first electrode.

5. The double layer capacitor cell of claim 4, wherein the cells contain material which comprise the second electrode.

6. A high surface area activated carbon electrode device formed by a process comprising:

(a) preparing a composition comprising cross-linkable resin, a filler, and a binder;

(b) forming the composition into a shaped article;

(c) curing the article;

(d) carbonizing the article; and (e) activating the article to form an activated carbon electrode.

7. The activated carbon electrode of claim 6, wherein the composition comprises 50–90 wt. % resin, 10–50 wt. % filler.

8. The activated carbon electrode of claim 7, wherein the composition comprises 50–75 wt. % resin, 25–45 wt. % filler, and 2–10 wt. % binder.

9. The activated carbon electrode of claims 7 or 8, further comprising at least one processing aid selected from the group consisting of lubricant, molding agent, and acid.

10. The activated carbon electrode of claim 6, wherein the shaped article is formed by a method selected from the group consisting of casting, extrusion, and molding.

11. The activated carbon electrode of claim 10, wherein the shaped article is formed by extrusion, and wherein the process further comprises the step drying the shaped article or extrudate prior to the curing step.

12. The activated carbon electrode of claim 11, wherein the extrudate is dried at a temperature in the range of 75–95, cured at a temperature in the range of 110–180, carbonized in inert gas at a temperature in the range of 700–1100, and activated in $CO_2$ at a temperature in the range of 750–1000.

* * * * *